(12) United States Patent
Dabak (10) Patent No.: US 8,174,955 B2
(45) Date of Patent: *May 8, 2012

(54) RANDOM ACCESS PREAMBLE CODING FOR INITIATION OF WIRELESS MOBILE COMMUNICATIONS SESSIONS

(75) Inventor: Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1040 days.

This patent is subject to a terminal disclaimer.

(21) Appl. No.: 12/011,250

(22) Filed: Jan. 25, 2008

(65) Prior Publication Data

US 2008/0130482 A1 Jun. 5, 2008

Related U.S. Application Data

(63) Continuation of application No. 10/864,680, filed on Jun. 8, 2004, now Pat. No. 7,324,485, and a continuation of application No. 09/591,888, filed on Jun. 9, 2000, now Pat. No. 7,173,919.

(60) Provisional application No. 60/138,713, filed on Jun. 11, 1999, provisional application No. 60/139,334, filed on Jun. 15, 1999, provisional application No. 60/142,889, filed on Jul. 8, 1999.

(51) Int. Cl.
*H04J 11/00* (2006.01)

(52) U.S. Cl. ........................................ 370/203; 370/206

(58) Field of Classification Search ........................ None
See application file for complete search history.

(56) References Cited

U.S. PATENT DOCUMENTS 5,237,586 A * 8/1993 Bottomley .................... 370/206
(Continued)

FOREIGN PATENT DOCUMENTS

WO        WO 98 18280            4/1998
(Continued)

OTHER PUBLICATIONS

Proposed EIA/TIA Wideband Spread Spectrum Standard (CDMA IS-95) pp. 6-8 through 6-20 and 6-161 through 6-168. (1995).

(Continued)

*Primary Examiner* — John Blanton
(74) *Attorney, Agent, or Firm* — Ronald O. Neerings; Wade James Brady, III; Frederick J. Telecky, Jr.

(57) ABSTRACT

A wireless communications network, including a base station (10) and wireless units (UE), is disclosed. The wireless units (UE) request a connection with the base station (10) by the transmission of a preamble within time slots designated by the base station (10). The disclosed preambles are Walsh Hadamard code symbols, repeated a number of times so as to have the same length as a cell-specific scrambling code. The wireless unit (UE) requesting a connection pseudo-randomly selects a time slot from those available, and one of the Walsh Hadamard code symbols, replicates the code symbol into a spread interleaved bitstream, scrambles this bitstream and transmits it to the base station (10). Upon receipt, the base station (10) applies the incoming bitstream to a matched filter (98) to descramble the signal, following which the symbol is de-interleaved by way of a sequence of delay lines (100). Despreaders (102) generate each bit of the symbol from corresponding taps of the delay lines (100), and the symbol is applied to a correlator (104, 126, 136) to determine the transmitted preamble.

22 Claims, 6 Drawing Sheets

U.S. PATENT DOCUMENTS

| | | | |
|---|---|---|---|
| 5,600,672 A * | 2/1997 | Oshima et al. | 375/219 |
| 5,790,537 A | 8/1998 | Yoon et al. | |
| 6,088,347 A | 7/2000 | Minn et al. | |
| 6,175,587 B1 | 1/2001 | Madhow et al. | |
| 6,483,828 B1 * | 11/2002 | Balachandran et al. | 370/342 |
| 6,665,308 B1 * | 12/2003 | Rakib et al. | 370/441 |
| 2002/0154678 A1 * | 10/2002 | Doetsch et al. | 375/130 |
| 2003/0189972 A1 * | 10/2003 | Berens et al. | 375/148 |
| 2004/0120274 A1 * | 6/2004 | Petre et al. | 370/320 |
| 2004/0202103 A1 * | 10/2004 | Suh et al. | 370/208 |
| 2004/0264556 A1 * | 12/2004 | Moussu et al. | 375/148 |
| 2005/0138671 A1 * | 6/2005 | Love et al. | 725/123 |
| 2005/0271025 A1 * | 12/2005 | Guethaus et al. | 370/342 |
| 2006/0018289 A1 * | 1/2006 | Schulist et al. | 370/335 |

FOREIGN PATENT DOCUMENTS

| | | |
|---|---|---|
| WO | WO 98 45961 | 10/1998 |
| WO | WO 99 21375 | 4/1999 |

OTHER PUBLICATIONS

"Comparison of Detection Methods for RCH Preamble Signatures," TSG-RAN Working Group 1, Meeting No. 3, TSGR1#3 (99)140 Interdigital Comm. Corp., Mar. 22-23, 1999.

"Further Clarification of Nokia's RACH Preamble Proposal," TSG-RAN Working Group Meeting No. 5, TSGR1-599/99, Nokia, Jun. 1-4, 1999.

"Technical Specification," TS 25.213, V2.0.0 (Apr. 1999), 3rd Generation Partnership Project (3GPP); Technical Specification Group (TSG); Radio Access Network (RAN); Working Group 1 (WG1); Spreading and Modulation (FDD), pp. 1-26.

"Technical Specification," TS 25.213, V2.1.0 (Apr. 1999), 3rd Generation Partnership Project (3GPP); Technical Specification Group (TSG); Radio Access Network (RAN); Working Group 1 (WG1); Spreading and Modulation (FDD) (1999), pp. 1-22.

"Physical Layer Procedures," TS 25.214, V1.0.0 (Apr. 1999), 3rd Generation Partnership Project (3GPP); Technical Specification Group (TSG); Radio Access Network (RAN); Working Group 1 (WG1); Spreading and Modulation (FDD); 3Gpp Technical Specification Online, Apr. 1999, pp. 1-31, XP002180895, Retrieved from the Internet: URL: http://www.3gpp.org, retrieved on Oct. 18, 2001, pp. 18-19.

* cited by examiner

FIG. 1

FIG. 2
(AMENDED)

FIG. 9
(AMENDED)

RANDOM ACCESS PREAMBLE CODING FOR INITIATION OF WIRELESS MOBILE COMMUNICATIONS SESSIONS

CROSS-REFERENCE TO RELATED APPLICATIONS

This application is a continuation of and claims the benefit, under 35 U.S.C. §120, of U.S. Nonprovisional application Ser. No. 10/864,680, filed Jun. 8, 2004, now U.S. Pat. No. 7,324,485, Ser. No. 09/591,888, now U.S. Pat. No. 7,173,919, filed Jun. 9, 2000, and under 35 U.S.C. §119(e)(1), of U.S. Provisional Applications No. 60/138,713, filed Jun. 11, 1999, No. 60/139,334, filed Jun. 15, 1999, and No. 60/142,889, filed Jul. 8, 1999, all incorporated herein by reference.

STATEMENT REGARDING FEDERALLY SPONSORED RESEARCH OR DEVELOPMENT

Not applicable.

BACKGROUND OF THE INVENTION

This invention is in the field of mobile wireless communications, and is more specifically directed to the initiation of multiple access communications sessions.

The popularity of mobile wireless communications has increased dramatically over recent years. It is expected that this technology will become even more popular in the foreseeable future, both in modern urban settings and also in rural or developing regions that are not well served by line-based telephone systems. This increasing wireless traffic strains the available communications bandwidth for a given level of system infrastructure. As a result, there is substantial interest in increasing bandwidth utilization of wireless communications system to handle this growth in traffic.

Modern digital communications technology utilizes multiple-access techniques to increase bandwidth utilization, and thus to carry more wireless traffic. Under current approaches, both time division multiple access (TDMA) and code division multiple access (CDMA) techniques are used in the art to enable the simultaneous operation of multiple communications conversations, or wireless "connections". For purposes of this description, the term "conversations" refers to either voice communications, data communications, or any type of digital communications. As evident from the name, TDMA communications are performed by the assignment of time slots to each of multiple communications, with each conversation transmitted alternately over short time periods. CDMA technology, on the other hand, permits multiple communications sessions to be transmitted simultaneously in both time and frequency, by modulating the signal with a specified code. On receipt, application of the code will recover the corresponding conversation, to the exclusion of the other simultaneously received conversations.

As is fundamental in the art, a single base station in a wireless communications network conducts communications sessions with multiple mobile wireless transmissions in an area of coverage, or "cell". In addition, each base station is aware of the remaining bandwidth available for new communications sessions that may be initiated relative to a wireless unit within its cell. In this regard, the base station is aware of the presence of those mobile wireless units that are turned on and within its cell, and also of the identity of those units, regardless of whether the units are currently connected in a conversation. In this way, wireless units may be called by another party from anywhere in the telephone network, and the wireless units themselves may initiate a connection by placing a call.

In order for a wireless unit to place a call to a particular telephone number, it must send a request for a connection to the base station. An initiation sequence is then carried out, according to conventional systems, in which the channel for the desired communications is assigned by the base station and acknowledged by the wireless unit.

For example, in a CDMA system, the base station and wireless unit must "agree" upon a modulation code to be used in the communications link between these two stations. In conventional CDMA systems, the codes are not determined a priori, given the transient nature of wireless units within a base station coverage area. As such, techniques have been developed by way of which the wireless units and base station may communicate prior to the assignment of a modulation code. According to a widely used technique for this initialization, the base station periodically broadcasts signals that indicate the number and position of reserved time slots within a communications frame for initialization, to each of the wireless units in its area that are not currently connected. These broadcast signals are received by each wireless unit, so that, in one of these time slots, the unit may send a signal to the base station to request a connection. This request signal is commonly referred to as a "preamble," following which the message part of the transmission is communicated.

It is quite likely, however, that multiple wireless units may try to establish communications at the same time, and may therefore be simultaneously sending preambles within the same time slot. As such, conventional CDMA wireless communications systems specify a set of modulation codes from which the wireless unit selects a code to request a connection. The codes in the set are orthogonal relative to one another, in the sense that the base station can resolve the sources of simultaneously received messages encoded by different ones of the set of modulation codes. Because the requesting wireless unit typically selects a modulation code in a pseudo-random manner, these channel selection codes are typically referred to as "random access" codes. These random access codes greatly reduce the probability of a collision between two (or more) wireless units in a coverage area requesting a connection at the same time slot. For example, if eight time slots are available for requesting a connection, using one of sixteen available random access codes, the likelihood of a collision between two wireless units that request a connection is reduced from one in eight to one in 128.

An example of this random access approach uses a 256 chip spreading code in the generation of the preamble part of the transmission. This conventional approach is described in *Technical Specification TS* 25.213 V2.1.0: *Spreading and Modulation* (3$^{rd}$ Generation Partnership Project, 1999). To request a communications session according to this approach, a wireless unit randomly selects one of sixteen signature symbols for its preamble. The signature consists of a sixteen-symbol sequence of plus or minus the complex value A=1+j. One example of a sixteen symbol signature is [A, A, A, −A, −A, −A, A, −A, −A, A, A, −A, A, −A A A]. Each symbol in this preamble is then spread into 256 consecutive chips, following which the spread preamble is modulated and transmitted to the base station by the requesting wireless unit.

The mobile nature of the wireless units presents certain difficulties to the resolution of simultaneous encoded request signals, however. Although random access codes, such as the 256-chip spread coded random access preamble noted above, provide signatures that are theoretically orthogonal, this orthogonality presumes simultaneous receipt at the base station. As noted above, preambles are simultaneously transmitted by mobile units in the time slots specified by the base station. However, simultaneously transmitted preambles from widely differing distances in the cell will not simultaneously arrive at the base station. According to the conventional 256-chip spread coded approach, coded signatures are not necessarily orthogonal when one preamble is significantly time-shifted relative to another. In other words, time-shifted preambles coded according to this conventional approach will cross-correlate with one another. As such, in some circumstances, conventional CDMA base stations may not always be able to resolve different random access codes from multiple wireless units.

This cross-correlation of random access codes received from varying transmission distances has been addressed by prior techniques. For example, a so-called "long" code has been developed which uses a real-valued version of the uplink spreading code to spread the wireless unit signature over a much longer preamble. The length of the preamble is, in this approach, selected to be significantly longer than the greatest time delay expected within a given cell. This long code is derived simply by spreading each bit of a sixteen-bit Gold code signature symbol A over a number of chips, for example 256 chips; in this case, the sixteen-bit symbol becomes sixteen sequences of 256-chip values, for a total length of 4096 chips. This longer preamble greatly reduces the cross-correlation between orthogonal signatures that are received at the maximum delay (and thus the maximum differential distance) relative to one another.

However, it has been observed that this long code approach remains vulnerable to velocity variations between requesting mobile wireless units. The well-known Doppler effect refers to the shift in frequency that results for a moving source of periodic signals. For the case of mobile wireless units in a moving automobile, train, or especially an airplane, the Doppler shift causes a phase shift that accumulates over the transmission length of the request. As noted above, the conventional "long" random access code has a length of 4096 chips (i.e., sixteen symbols of 256 chips each), over which the orthogonal signatures are analyzed to resolve different wireless units. Because of this code length, the accumulated Doppler phase shift can cause cross-correlation among codes, so that the base station may not be able to resolve simultaneous transmission requests.

Other approaches for encoding random access channel preambles have been derived to address the problem of Doppler shifts on the transmitted signals. One approach utilizes a differential encoding technique, in which the signature is determined by the differences between adjacent symbols in the preamble. Some level of cross-correlation for time-delayed signals has been observed for this differential approach, rendering it somewhat vulnerable to differences in distance between simultaneously-transmitting mobile wireless units. Because of this vulnerability, coherent encoding over a long (e.g., 4096 chip) preamble has been used for slowly moving or stationary transmitters to provide adequate orthogonality for variations in transmission distance, while rapidly moving mobile units utilize the differential coding. Of course, the implementation of different random access channel encoding for mobile units of different velocities significantly increases the complexity of transmitters and base stations.

Another approach uses segmented non-coherent decoding for fast-moving transmitters, in which the receiver decodes the preamble in shorter segments of symbols, for example four segments of four symbols each. According to this technique, however, the segments are not orthogonal relative to one another.

BRIEF SUMMARY OF THE INVENTION

It is therefore an object of the present invention to provide a random access channel resolution method that is robust for mobile wireless transmissions from varying distances within a cell and also for transmissions from units that are widely varying in velocity.

It is a further object of the present invention to provide such a method in which the preamble encoding and decoding can be implemented in a computationally efficient manner.

It is a further object of the present invention to provide such a method in which quite large frequency offsets due to moving transmitters may be tolerated in the establishment of a wireless communications session.

Other objects and advantages of the present invention will be apparent to those of ordinary skill in the art having reference to the following specification together with its drawings.

The present invention may be implemented into a wireless communications system in which the transmission preamble is based upon a Walsh Hadamard code. Spreading is accomplished by repeating the code symbol a plurality of times to create a preamble of a length corresponding to that of a long code, creating a preamble of orthogonal symbols that are repeated in a spread fashion. The preamble is multiplied by a cell-specific long code, and the process is reversed upon receipt at the base station to recover the preamble.

DETAILED DESCRIPTION OF THE INVENTION

The present invention will be described in connection with a wireless voice and data communications system, particularly in the case where the wireless units are mobile within an area of coverage, or "cell". Further, the particular preferred embodiment of the invention will be described relative to such a system in which multiple communications of the Code Division Multiple Access (CDMA) type are handled by a base station in the cell. It is contemplated, however, that the present invention may also be used with other communications systems, for example mobile wireless communications using Time Division Multiple Access (TDMA) or other spread spectrum or broadband technologies, as well as other applications. It is to be understood, therefore, that the following description is presented by way of example only, and is not intended to limit the scope of the present invention as claimed.

Figure 1:
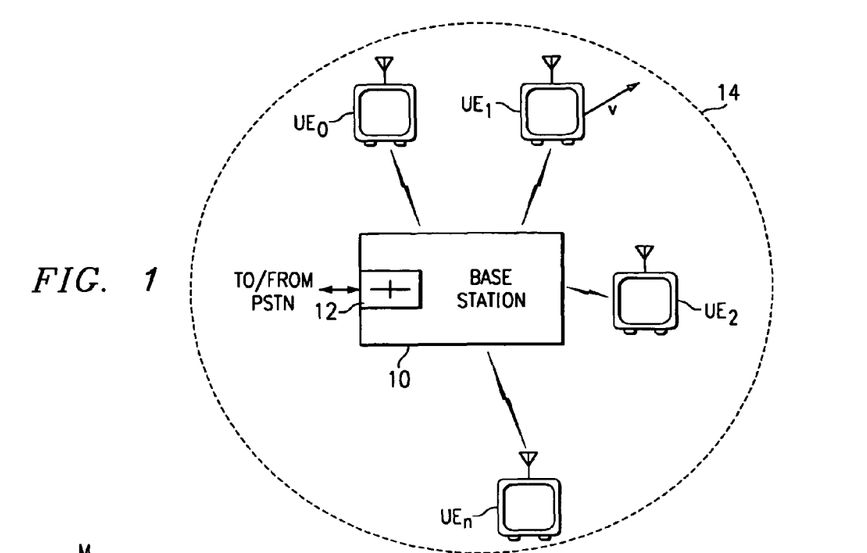
FIG. 1 is an electrical diagram, in block form, of a cell of a wireless communications system, according to the preferred embodiment of the invention.

An example of a deployment of a wireless communications system, according to the preferred embodiment of the invention, is illustrated in FIG. 1. As shown in FIG. 1, base station 10 is located somewhat centrally within an area of coverage, or cell, 14. Base station 10, as is conventional in the art, is a fixed facility which transmits and receives broadband, or spread spectrum, wireless communications to and from wireless units UE that are physically located within cell 14. As shown in FIG. 1, and is typical in the art, wireless units UE are mobile wireless units, such as digital cellular telephones. The number of wireless units UE within cell 14 may vary widely, depending upon the time of day, day of the week, and other events that can affect wireless telephone density within cell 14.

Typically, a large fraction of the wireless units UE within cell 14 are mobile units, and as such may be anywhere within the transmission area of cell 14 at any given point in time. For example, wireless unit $UE_2$ is quite close to base station 10, while wireless unit $UE_n$ is relatively distant from base station 10, near the edge of cell 14. Furthermore, wireless units UE may be moving within cell 14. For example, wireless unit $UE_1$ is moving away from base station 10 at velocity v. These variations in distance among wireless units UE, and their velocities of travel, present difficulties in the resolving of preamble codes for connection requests, according to conventional techniques. As will be described below, the preamble coding according to the preferred embodiment of the invention efficiently provides good resolution of coded preambles transmitted from different distances and at significant velocities.

The communications carried out between base station 10 and wireless units UE are, in this example, telephonic conversations between one of wireless units UE and another telephone set elsewhere in the telephone network. Base station 10 therefore includes the appropriate circuitry for effecting broadband communications with wireless units UE, as will be described in further detail below; additionally, base station 10 includes switching system 12 that carries out some level of switching of the communications links between individual wireless units UE and the public switched telephone network (PSTN).

Figure 2:
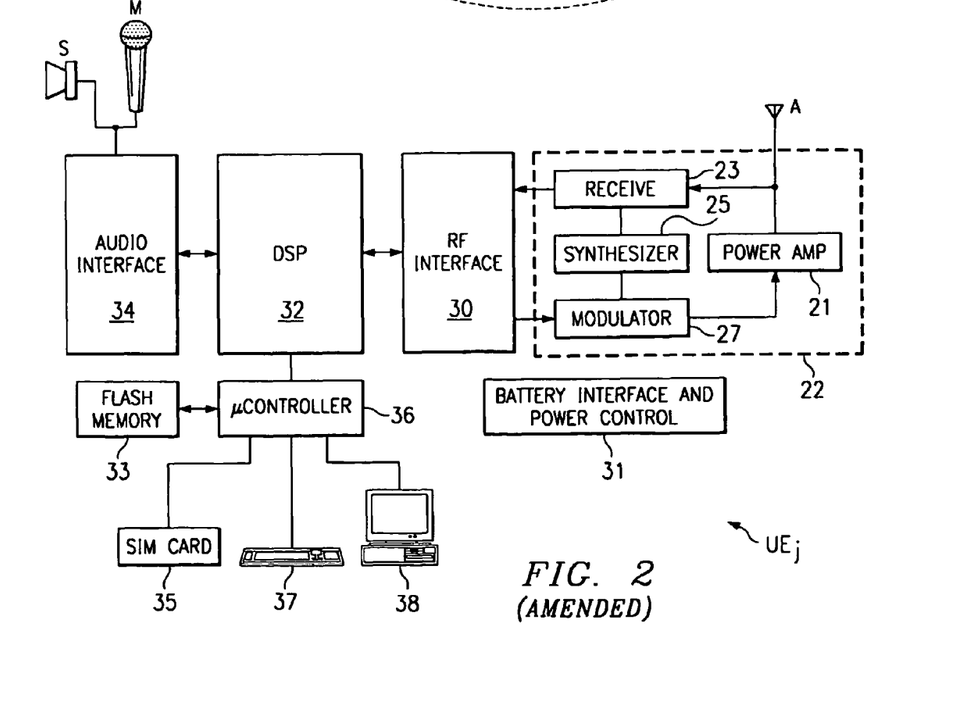
FIG. 2 is an electrical diagram, in block form, of a mobile wireless telephone in the wireless communications system of FIG. 1, according to the preferred embodiment of the invention.

Wireless units UE, as noted above, correspond to mobile wireless telephone sets. FIG. 2 is an electrical diagram, in block form, of the electronic architecture of a typical mobile wireless unit $UE_j$ (the index j referring generically to one of the wireless units UE shown in FIG. 1). It is contemplated, of course, that different ones of the wireless units UE in the overall system, such as shown in FIG. 1, may be constructed according to different architectures. As such, the architecture of the construction of wireless unit $UE_j$ shown in FIG. 2 is provided by way of example only, it being understood that such other alternative architectures may also be used in connection with the present invention.

The exemplary architecture illustrated in FIG. 2 corresponds to a so-called "second generation", or "2G" baseband architecture, such as is typically used to carry out TDMA and CDMA broadband communications. Radio subsystem 22 of wireless unit $UE_j$ is directly connected to antenna A, and handles the power amplification and analog processing of signals transmitted and received over antenna A. On the transmit side, modulator 27 in radio subsystem 22 receives the signals to be transmitted from RF (radio frequency) interface circuitry 30, and generates a broadband modulated analog signal, under the control of synthesizer 25. Power amplifier 21 amplifies the output of modulator 27 for transmission via antenna A. On the receive side, incoming signals from antenna A are received by receiver 23, filtered and processed under the control of synthesizer 25, and forwarded to RF interface circuitry 30.

RF interface circuitry 30 processes both incoming and outgoing signals within the analog baseband of wireless unit $UE_j$. On the transmit side, RF interface circuitry 30 receives digital signals from digital signal processor (DSP) 32, and performs the appropriate filtering and phase modulation appropriate for the particular transmission protocol. For example, multiple channels of encoded digital bitstreams may be forwarded to RF interface circuitry 30 by DSP 32. RF interface circuitry 30 converts these digital data into analog signals, phase-shifting selected converted bitstreams to provide both in-phase (I) and quadrature (Q) analog signal components, and applies analog filtering as appropriate to the signals as handed off to modulator 27 in radio subsystem 22 described above.

On the receive side, RF interface circuitry 30 converts the analog signal received by receiver 23 of radio subsystem 22 into the appropriate digital format for processing by DSP 32. For example, the in-phase (I) and quadrature (Q) components of the received signal are separated and filtered. Analog to digital conversion is then carried out by RF interface circuitry 30, so that digital bitstreams corresponding to the separated and filtered components of the received signal may be received by DSP 32.

DSP 32 executes the appropriate digital signal processing upon both the signals to be transmitted and those received. In this regard, DSP 32 is connected to audio interface 34, which in turn is coupled to microphone M and speaker S for input and output, respectively. Audio interface 34 includes the necessary analog-to-digital conversion circuitry and filtering for generating a sampled bitstream digital signal based upon the sound received by microphone M, and conversely includes digital-to-analog conversion circuitry, filtering, and amplification for driving speaker S with an analog signal corresponding to the received and processed communications.

The digital functions performed by DSP 32 will depend, of course, upon the communications protocol used by wireless unit $UE_j$. On the receive side, DSP 32 will perform such functions as channel decoding of the data from RF interface circuitry 30 to retrieve a data signal from the digitally spread signal received, followed by the decoding of the speech symbols from the channel decoded data using techniques such as inverse discrete Fourier transforms (IDFT) and the like. Equalization, error correction, and decryption processes are also performed upon the received signal as appropriate. The resulting signal processed by DSP 32 on the receive side is then forwarded to audio interface 34, for amplification and output over speaker S.

On the transmit side, substantially the converse operations are applied. The incoming digitally sampled voice input from microphone M via audio interface 34 is encoded into symbols, for example by way of a DFT operation, and the symbols are then encoded into a digital spread spectrum signal by the application of channel codes. Scrambling or other encryption processing is then performed, along with the necessary pre-equalization and other filtering. The resulting digital signal is then forwarded to RF interface circuitry 30, as noted above.

According to the preferred embodiment of the present invention, DSP 32 is operable to generate preamble codes to be transmitted by wireless unit $UE_j$. These preamble codes are transmitted over antenna A to request the initiation of a communications session, such as a wireless telephone conversation. These orthogonal preamble codes are selected, according to this preferred embodiment of the invention, to be resolvable over a wide range of distances of wireless unit $UE_j$ from base station 10 (FIG. 1), and in the event that wireless unit $UE_j$ is being used in a rapidly traveling conveyance such as an automobile, train, or airplane. The generation of these preambles will be described in further detail below.

In this regard, DSP 32 preferably has a significant amount of processing capacity to handle the digital processing necessary for both the transmit and receive operations. An example of a suitable digital signal processor for use as DSP 32 is the TMS320c5x family of digital signal processors available from Texas Instruments Incorporated.

Other support circuitry is also provided within wireless unit $UE_j$ as shown in FIG. 2. In this example, microcontroller 36 handles the control of wireless unit $UE_j$ other than the data path. Such control functions include resource management, operating system control, and control of the human interface; in this regard, microcontroller 36 operates with such functions as flash memory 33 (for storage of the operating system and user preferences), SIM card 35 (for add-on functionality), keypad 37, and user display 38. In addition, wireless unit $UE_j$ also includes battery interface and power control subsystem 31, as shown in FIG. 1, for monitoring the status of the battery for wireless unit $UE_j$, and implementing power saving functions such as sleep modes, and the like.

Figure 3:
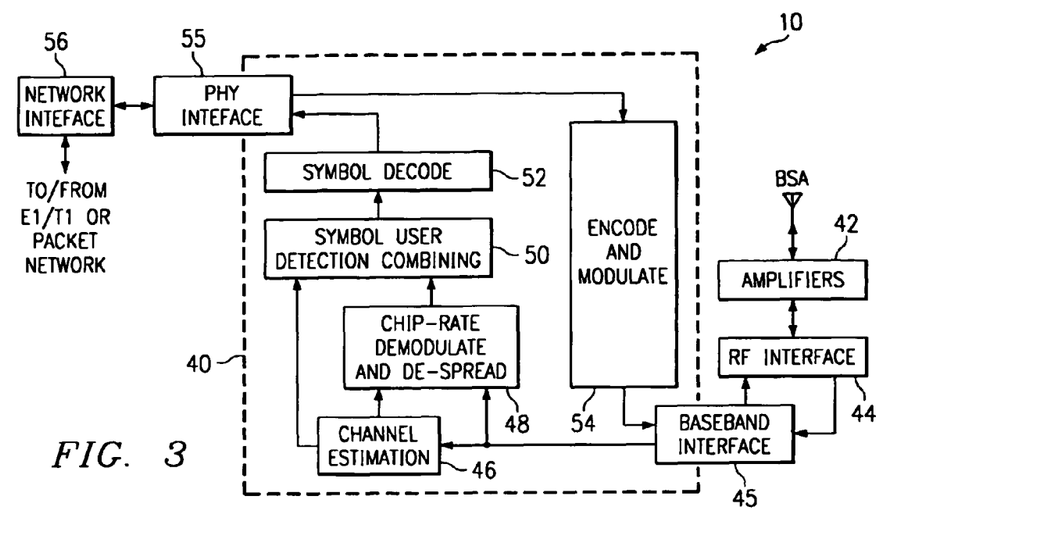
FIG. 3 is an electrical diagram, in block form, of a base station in the wireless communications system of FIG. 1, according to the preferred embodiment of the invention.

Referring now to FIG. 3, the construction of an example of base station 10 according to a preferred embodiment of the invention will now be described, for the case of a second/third generation base transceiver station. It will be appreciated by those skilled in the art that this particular architecture is provided by way of example only, and that other base station architectures may be used according to the present invention.

As shown in FIG. 3, base station 10 includes amplifiers 42 for driving amplified transmission signals over one or more base station antennae BSA, and for amplifying signals received from those antennae BSA. RF interface function 44 includes the appropriate transmit and receive formatting and filtering circuitry. Additionally, RF interface function 44 includes analog-to-digital converters for digitizing the amplified receive signals, and digital-to-analog converters for placing the transmitted signals into the analog domain. As such, RF interface function 44 communicates digitally with baseband interface 45, which provides the appropriate signal formatting between RF interface function 44 and baseband device 40.

Baseband device 40 communicates with the ultimate network, which may be of the E1 or T1 class, or a packet network as shown in FIG. 3, by way of physical layer interface 55 and network interface adapter 56. Physical layer interface 55 and network interface adapter 56 are conventional subsystems, selected according to the type of network and corresponding interface desired for base station 10. In the implementation of FIG. 1, network interface adapter 56 interfaces with switching system 12.

Baseband device 40 performs the digital signal processing functions in handling the wireless communications at base station 10. To perform this function, it is contemplated that baseband device 40 will be a subsystem including one or more high-performance digital signal processor (DSP) devices, such as those of the TMS320c5x and TMS320c6x class of DSPs available from Texas Instruments Incorporated, along with the appropriate memory and external functions suitable for handling the digital processing requirements of base station 10. In FIG. 3, the implementation of baseband device 40 will be described according to its various functions, rather than by way of its construction, it being contemplated that those skilled in the art will be readily able to realize baseband device 40 using such conventional integrated circuits from this functional description, and according to the capacity desired for base station 10.

On the transmit side, baseband device 40 includes encode and modulate function 54, which is coupled between physical layer interface 55 and baseband interface 45, as shown in FIG. 3. Encode and modulate function 54 receives digital data from physical layer interface 55, and performs the appropriate digital processing functions for the particular protocol. For example, encode and modulate function 54 may first encode the received digital data into symbols. These symbols are then spread, by way of a spreading code, into a sequence of chips, according to a selected chip rate; the spreading may also include the spreading of the symbols into multiple subchannels. Typically, a cell-specific scrambling code is then applied to the spread symbols, so that the receiving wireless unit UE can distinguish transmissions generated by this base station 10, from those of neighboring cells. Modulation of the spread symbols is then performed; commonly, the multiple subchannels are split into in-phase (I) and quadrature (Q) groups, so that the eventual modulated signal includes both components. The spread spectrum signal is then applied to baseband interface 45, after the appropriate filtering and pre-equalization for channel distortion, for transmission over antennae BSA via RF interface function 44 and amplifiers 42.

On the receive side, baseband device 40 receives incoming digital signals from baseband interface 45, after digitization of the received signals within RF interface function 44. These signals are applied to chip-rate demodulation and despreading function 48, the construction of which will be described in further detail below, and which derives the transmitted symbols from the digitized received data. Considering that base station 10 receives signals over multiple channels, from multiple wireless units UE in its cell 14, channel estimation function 46 estimates the random channel variation. Channel estimation function 46 and chip-rate demodulation and despreading function 48 each provide output to symbol user detection and combining function, in which the demodulated data are associated with their respective channels, following which symbol decode function 52 decodes the received symbols, for each channel and thus each conversation, into a bit stream suitable for communication to the network via physical layer interface 55 and network interface function 56.

Figure 4:
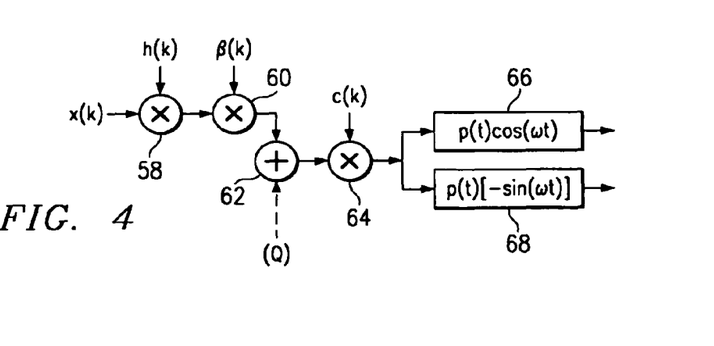
FIG. 4 is a functional diagram, in schematic form, illustrating data flow in the encoding of wireless communications.
Figure 5:
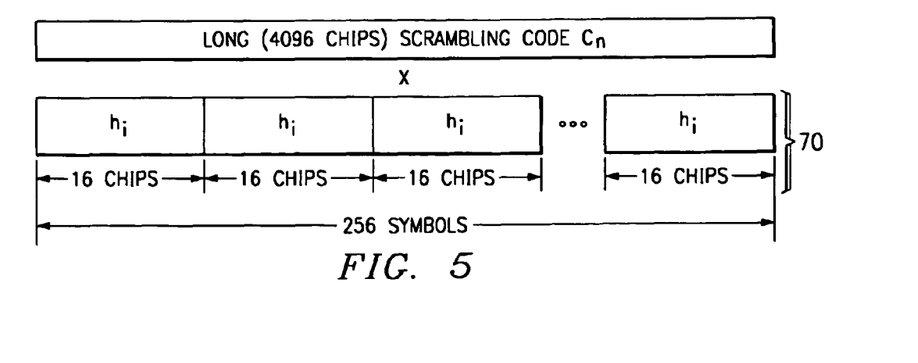
FIG. 5 is an illustration of the arrangement of code symbols for generating a preamble, according to the preferred embodiment of the invention.

As discussed above, the present invention is directed to the generation of connection requests by mobile units, such as wireless telephone units UE in the example of FIG. 1, and to the receipt and decoding of such requests by the corresponding base station 10. Referring now to FIGS. 4 and 5, the principle of operation in the generation of preambles for requesting connection, according to the preferred embodiment of the invention, will now be described.

FIG. 4 illustrates the data flow for a transmitting element, such as mobile user equipment UE in the system of FIG. 1, for example configured as shown in FIG. 2. In this example, a data bitstream x(k) corresponds to the symbol stream that is to be transmitted, for example as part of the eventual data message. This bitstream x(k) is multiplied, in operation 58, by spreading code h(k). Spreading operation 58 spreads each bit of bitstream x(k) into multiple "chips", as known in the art. In effect, spreading operation 58 converts each bit of bitstream x(k) into a series of samples, or chips, modulated by the particular code h(k), with the chip rate out of operation 58 thus being a multiple of the data rate of bitstream x(k). A gain factor β is then applied to the spread output of operation 58 in gain stage 60, to adjust the power of the particular channel.

The channel corresponding to bitstream x(k) is an in-phase component (I) that is then combined, at adder 62, with a quadrature component (Q). As known in the art, the transmission may consist of a single data channel as shown in FIG. 4, combined by adder 62 with a control channel that is at 90° phase relative to the data channel; this quadrature arrangement permits separation of the data and control information upon receipt. As known in the art, the transmission may also be carried out over multiple data channels, each channel receiving a different one of a set of orthogonal spreading codes h(k) to permit separation. The multiple data channels may be grouped into in-phase and quadrature groups, with the groups combined prior to adder 62, as known in the art. Only a single data channel for bitstream x(k) is shown in FIG. 4, for clarity in this description, it being understood that those skilled in the art will be readily able to incorporate the present invention into a multiple channel transmission.

The combined I and Q components from adder 62 are then scrambled by a scrambling code c(k) in operation 64. Scrambling code c(k) is cell-specific, in that all transmissions taking place in the same cell (e.g., cell 14 of FIG. 1) use the same scrambling code. Scrambling code c(k) thus allows each system element to resolve incoming communications for its cell from those that may be received from other cells. Typically, scrambling code c(k) is a "long" code, for example 4096 chips in length.

Following scrambling operation 64, the scrambled spread signal is then modulated for transmission by operations 66, 68 into in-phase and quadrature components, respectively. Given that scrambling code c(k) will generally have complex coefficients, the in-phase and quadrature output components from operations 66, 68 will generally not correspond to the in-phase and quadrature input components to adder 62.

The coding of FIG. 4 applied to transmission is, of course, fully reversible upon receipt.

In addition to the voice or data communication payloads, preambles are generated according to the scheme of FIG. 4 by wireless units UE to request a connection with base station 10. According to the present invention, the particular spreading codes h(k) are selected to provide orthogonality even in situations where simultaneously requesting wireless units UE are at widely differing distances from base station 10, and moving at significant velocities, such as suggested by FIG. 1.

According to the preferred embodiment of the invention, the spreading codes h(k) applied in operation 58 correspond to repetitions of a selected one of a set of orthogonal Walsh Hadamard codes. In effect, the input bitstream x(k) is assumed to be "1", so that the output of operation 58 is a Walsh Hadamard code symbol itself. This spreading code output is then multiplied, in operation 64, by the cell-specific scrambling code. As will become apparent below, the selection of Walsh Hadamard codes is particularly beneficial in facilitating transform operations upon receipt.

According to an exemplary implementation of the preferred embodiment of the invention, scrambling code c(k) is a 4096 chip segment of a $2^{25}-1$ length, real-valued, Gold code. Preferably, cell-specific scrambling code c(k) is formed in the same manner as the in-phase dedicated channel uplink scrambling code, and as such is selected as one of 256 orthogonal 4096-chip segments of the orthogonal Gold code, with the 256 codes determined from different initial shift register contents in such code generation. The resulting scrambling code c(k) is then associated with sixteen possible preamble codes h(k), each corresponding to a different Walsh Hadamard code.

As is well known, length 16 Walsh Hadamard codes $h_m(k)$, for m=0, 1, ..., 15 are specified as:

| | | | | | | | | | | | | | | | | |
|---|---|---|---|---|---|---|---|---|---|---|---|---|---|---|---|---|
| $h_0$    | 1 |  1 | 1  |  1 | 1  |  1 | 1  |  1 | 1  |  1 | 1  |  1 | 1  |  1 | 1  |  1 |
| $h_1$    | 1 | −1 | 1  | −1 | 1  | −1 | 1  | −1 | 1  | −1 | 1  | −1 | 1  | −1 | 1  | −1 |
| $h_2$    | 1 |  1 | −1 | −1 | 1  |  1 | −1 | −1 | 1  |  1 | −1 | −1 | 1  |  1 | −1 | −1 |
| $h_3$    | 1 | −1 | −1 |  1 | 1  | −1 | −1 |  1 | 1  | −1 | −1 |  1 | 1  | −1 | −1 |  1 |
| $h_4$    | 1 |  1 | 1  |  1 | −1 | −1 | −1 | −1 | 1  |  1 | 1  |  1 | −1 | −1 | −1 | −1 |
| $h_5$    | 1 | −1 | 1  | −1 | −1 |  1 | −1 |  1 | 1  | −1 | 1  | −1 | −1 |  1 | −1 |  1 |
| $h_6$    | 1 |  1 | −1 | −1 | −1 | −1 | 1  |  1 | 1  |  1 | −1 | −1 | −1 | −1 | 1  |  1 |
| $h_7$    | 1 | −1 | −1 |  1 | −1 |  1 | 1  | −1 | 1  | −1 | −1 |  1 | −1 |  1 | 1  | −1 |
| $h_8$    | 1 |  1 | 1  |  1 | 1  |  1 | 1  |  1 | −1 | −1 | −1 | −1 | −1 | −1 | −1 | −1 |
| $h_9$    | 1 | −1 | 1  | −1 | 1  | −1 | 1  | −1 | −1 |  1 | −1 |  1 | −1 |  1 | −1 |  1 |
| $h_{10}$ | 1 |  1 | −1 | −1 | 1  |  1 | −1 | −1 | −1 | −1 | 1  |  1 | −1 | −1 | 1  |  1 |
| $h_{11}$ | 1 | −1 | −1 |  1 | 1  | −1 | −1 |  1 | −1 |  1 | 1  | −1 | −1 |  1 | 1  | −1 |
| $h_{12}$ | 1 |  1 | 1  |  1 | −1 | −1 | −1 | −1 | −1 | −1 | −1 | −1 | 1  |  1 | 1  |  1 |
| $h_{13}$ | 1 | −1 | 1  | −1 | −1 |  1 | −1 |  1 | −1 |  1 | −1 |  1 | 1  | −1 | 1  | −1 |
| $h_{14}$ | 1 |  1 | −1 | −1 | −1 | −1 | 1  |  1 | −1 | −1 | 1  |  1 | 1  |  1 | −1 | −1 |
| $h_{15}$ | 1 | −1 | −1 |  1 | −1 |  1 | 1  | −1 | −1 |  1 | 1  | −1 | 1  | −1 | −1 |  1 |

According to this exemplary implementation, the selected preamble code h(k) is repeated 256 times, in an interleaved fashion as will now be described.

Of course, alternative combinations of preamble code length and number of repetitions may equivalently be used. For example, a Hadamard code of length 32 could be repeated 128 times, to still correspond to the 4096-chip scrambling code. Scrambling codes of different length may also be used, depending upon the application, providing still more combinations of code length and number of repetitions.

Consider the set of sixteen Walsh Hadamard codes $h_m(k)$, m=0, 1, ..., 15, and the set of 256 scrambling codes $c_n(k)$, n=0, 1, ..., 255, where each code $h_m$ is sixteen chips long, and each code $c_n$ is 4096 chips long. The $m^{th}$ preamble $s_{mn}$ output by operation 64 of FIG. 4, corresponding to the $n^{th}$ scrambling code, may be expressed:

$$s_{mn}(k) = c_n(k) \sum_{i=0}^{255} h_m(k - 16i)$$

The summation term:

$$\sum_{i=0}^{255} h_m(k-16i)$$

corresponds to 256 repetitions of the length sixteen Walsh Hadamard code. As shown in FIG. 5, the arrangement of preamble symbol 70 according to the preferred embodiment of the invention consists of one of the sixteen possible Walsh Hadamard code symbols $h_m$, repeated 256 times to create a 4096-chip preamble. In other words, the first bit is the same in each of the 256 code symbols $h_m$, the second bit is the same in each of the 256 code symbols h, and so on. This arrangement of preamble symbol 70 is thus in stark contrast to conventional Gold coded preambles, in which each bit of the Gold code symbol is repeated over a number of chips, followed by the next bit repeated for those chips, and so on. Also as shown in FIG. 5 and as noted above, preamble symbol 70 is then multiplied by the particular cell-specific scrambling code c, prior to transmission.

Of course, the number of repetitions of the Walsh Hadamard code symbol will vary with the length of the "long" code that is to be applied, and as such the implementation described above and illustrated in FIG. 5 is by way of example only. Another example, corresponding to current standards, utilizes a 3840-hip long code. In this case, the length sixteen Walsh Hadamard code is repeated 240 times.

Figure 6:
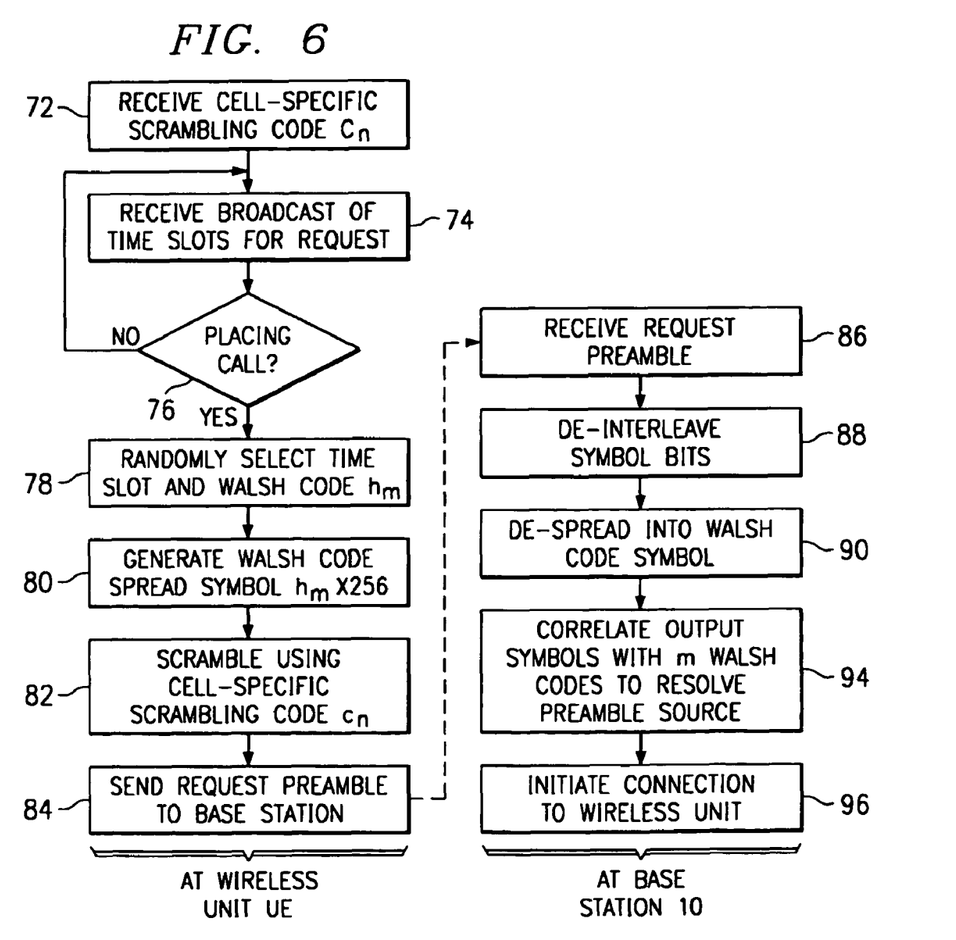
FIG. 6 is a flow diagram illustrating the operation of a wireless unit and a base station, according to the preferred embodiment of the invention.

Referring now to FIG. 6, the overall operation of wireless unit UE in combination with base station 10, in requesting a connection according to the preferred embodiment of the invention, will now be described. As will be apparent from the following description, the operations illustrated in FIG. 6 are primarily performed by DSP 32 in the architecture of wireless unit UE shown in FIG. 2, according to this preferred embodiment of the invention; of course, the particular circuit executing the operations of FIG. 6 will depend upon the specific architecture used to realize wireless unit UE. As shown in FIG. 6, this operation begins, in process 72, with wireless unit UE receiving cell-specific scrambling code $c_n$ from base station 10, for example upon entry of wireless unit UE into cell 14 serviced by base station 10. This cell-specific scrambling code $c_n$ is used by wireless unit UE for its transmissions, both the preamble for requesting a connection and also the eventual payload.

In process 74, wireless unit UE receives a broadcast message from base station 10 that indicates the particular periodic time slots within which any wireless unit UE may transmit a preamble in order to request a connection. As known in the art, this broadcast by base station 10 is periodic, so that the wireless units UE may receive updates of the time slots currently available for these requests; of course, depending upon the instantaneous call traffic within the cell, the number of available time slots will vary over time. In decision 76, wireless unit UE decides whether its user wishes to place a call; if not (decision 76 is NO), wireless unit UE returns to process 74 to again receive the next broadcast of the available time slots for requesting connections, and repeats decision 76 accordingly.

Upon the user wishing to place a call (decision 76 is YES), wireless unit UE selects one of the available time slots for issuing the request, and selects one of the Walsh Hadamard codes $h_m$ for constructing the preamble, both in process 78. According to the preferred embodiment of the invention, the selection of process 78 is performed by way of a pseudo-random selection algorithm, in order to minimize the likelihood that another wireless unit UE in the same cell 14 will select the same time slot and same Walsh Hadamard code for its own request. According to the preferred embodiment of the invention as described above, in which sixteen Walsh Hadamard codes $h_m$ of length sixteen are available, selection process 78 will thus randomly select one of the sixteen codes $h_m$ listed above.

In process 80, DSP 32 in wireless unit UE spreads the selected Walsh Hadamard code $h_m$ in an interleaved fashion, by repeating the code symbol a number of times sufficient to match the length of the eventual sampling code. For the present example, in which a 4096-chip scrambling code $c_n$ is used, the length sixteen Walsh Hadamard code $h_m$ is repeated 256 times (16 times 256 being 4096), effectively spreading the code symbol in an interleaved fashion as described above relative to FIG. 5. Process 82 is then performed by wireless unit UE to multiply the spread code symbol according to the cell-specific scrambling code $c_n$ received from base station 10. Further oversampling of the scrambled signal may also be applied, as desired. The resulting preamble is then modulated and transmitted by wireless unit UE to base station 10 during the available time slot that was selected in process 78.

Base station 10 receives the transmitted preamble in process 86. The received signal corresponding to this preamble is amplified, converted from analog to digital, filtered, and the like, by circuitry such as amplifiers 42, RF interface 44, and baseband interface 46 of base station 10 for the exemplary architecture of FIG. 2. The resulting digital signal is then descrambled, demodulated, and de-spread by chip-rate demodulate and despread function 48 of base station 10, to recover the particular Walsh Hadamard code symbol $h_m$ that was selected and transmitted by wireless unit UE.

Figure 7:
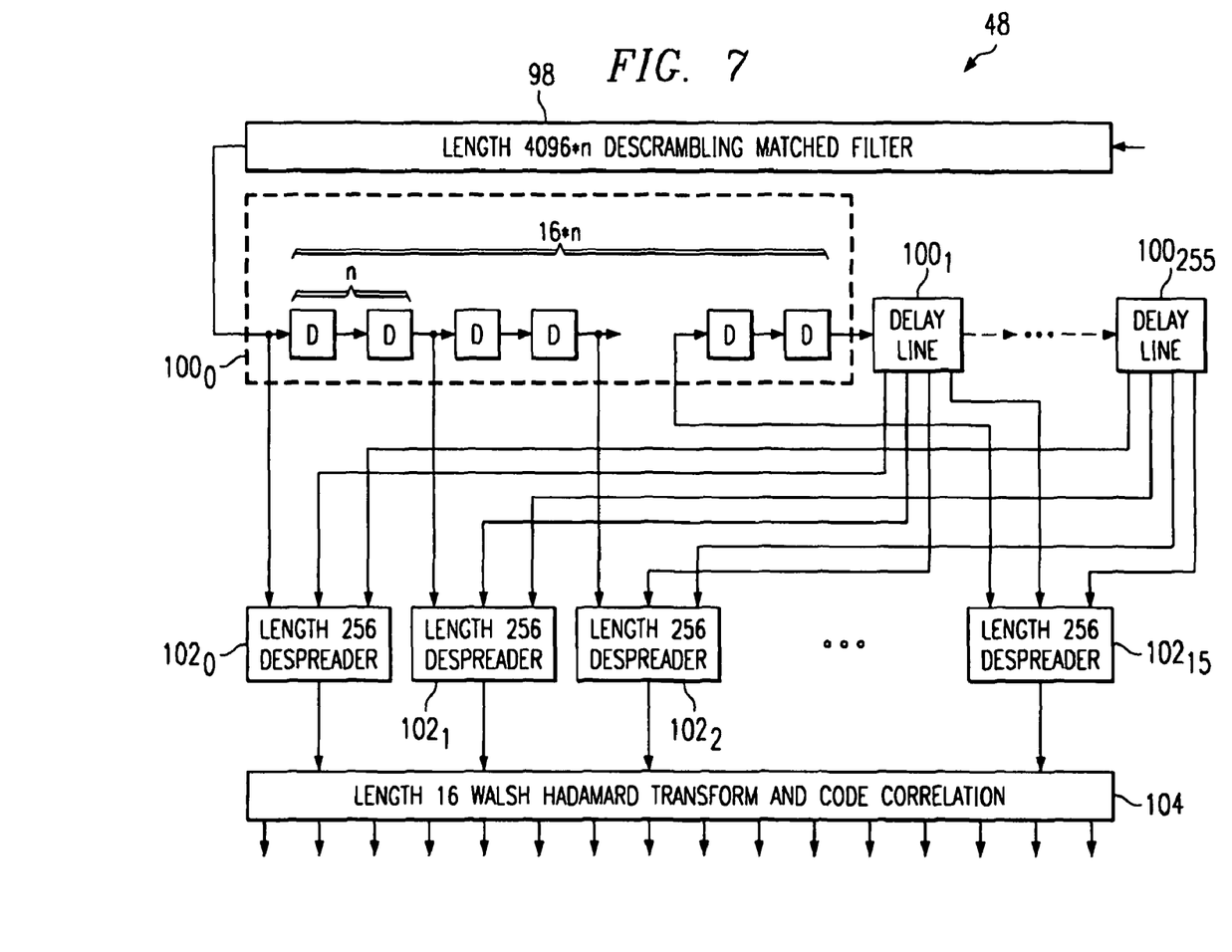
FIG. 7 is an electrical diagram, in block form, of chip-rate demodulation and despreading circuitry in a base station, according to a first preferred embodiment of the invention.

FIG. 7 illustrates an exemplary construction of chip-rate demodulate and despread function 48 according to the preferred embodiment of the invention, which operates according to the method illustrated in FIG. 6.

According to this implementation, the incoming digitized signal is first applied to a series of tapped delay lines 100, for de-interleaving the various interleaved spread code symbols in process 88 according to the preferred embodiment of the invention, as will now be described in detail. As shown in FIG. 7 for the example of delay line $100_0$, each of delay lines 100 include a series of delay stages D. The length of each delay line 100 is 16n, where n is the oversampling factor. Taps are located prior to the first delay stage D, and prior to every n delay stages thereafter. The example of delay line $100_0$ in FIG. 7 illustrates an oversampling factor n=2, such that there are two delay stages D between taps. The output of delay line $100_0$ is applied to the input of delay line $100_1$, which is next in sequence, and so on. For the present example, in which a length sixteen Walsh Hadamard code is spread 256 times, the number of delay lines 100 in chip-rate demodulate and despread function 48 is 256, as evident by final delay line $100_{255}$ in the sequence shown.

The taps from delay lines 100 are routed to appropriate ones of despreaders 102. Despreaders 102 constitute circuitry or functionality for combining corresponding bits of the incoming bitstream back into the bit values for a code symbol, and in this manner "despread" the number of chips for each bit back into a single bit value. Additionally, despreaders 102 apply the appropriate coefficients of the cell-specific scrambling code to the incoming bits, to reverse the multiplication of the spread code by scrambling code $c_n$ that was performed in transmission. In this example of length sixteen Walsh Hadamard codes, sixteen instances of despreaders 102 (i.e., despreaders $102_0$ through $102_{15}$) are provided, each despreader 102 having a length of 256 as indicated in FIG. 7. According to this preferred embodiment of the invention, in which the symbol is repeated, the bits within the symbol are interleaved among the repetitions, as described above. De-interleaving process 90 in the flow of FIG. 6 is thus performed by each despreader 102 receiving one tap from each of the 256 delay lines 100, from a tap position corresponding to the position of despreader 102 among the series of despreaders $102_0$ through $102_{15}$. For example, first despreader $102_0$ receives the first tap from delay line $100_0$ as shown, and the first tap from each of the 255 other delay lines $100_1$ through $100_{255}$. Second despreader $102_1$ receives the next tap from delay line $100_0$, after n delay stages D as shown, as well as the second tap from each of the 255 other delay lines $100_1$ through $100_{255}$ as shown. This arrangement continues for all of the remaining despreaders $102_2$ through $102_{15}$ in this example. The combination of the input taps to each despreader 102 is thus analyzed to generate an output bit, with the combination of the outputs of despreaders 102 constituting a sixteen-bit symbol in this embodiment of the invention.

The outputs of sixteen despreaders $102_0$ through $102_{15}$ are applied as a sixteen-bit symbol to transform and code correlation function 104, which compares this symbol, for example by way of correlation, to each of the possible Walsh Hadamard codes $h_m$ in the set, in process 94. In this example, transform and code correlation function 104 performs a Walsh Hadamard transform of length 16, and correlates this result against the transforms for each of the possible codes $h_m$. Sixteen outputs are generated, each of which is associated with one of the possible codes $h_m$, and indicating the extent to which the received bitstream correlates with its associated code $h_m$. These outputs are then analyzed at base station 10, for example in symbol user detection and combining function 50 (FIG. 3), to resolve the identity of the wireless unit UE that forwarded the request corresponding to the decoded preamble. Assuming that this decoded preamble is valid, base station 10 then initiates the requested connection to the requesting wireless unit UE, in process 96, enabling the communication of the voice or data payload information.

According to this preferred embodiment of the invention, significant advantages in the resolution of preamble codes are provided. The interleaving of the spread preamble code, illustrated by way of example in FIG. 5, provides a short length over which the coded symbols are coherent, and remain orthogonal. In the above example, each symbol is coherent over sixteen chips (times the applied oversampling factor), repeated 256 times. This short coherency length allows preambles of rapidly moving mobile units to be reliably resolved, since the accumulated Doppler phase shift is insignificant over such a short code length. However, the repetition of the symbols over the long code length provides the ability to resolve preambles transmitted by wireless units at widely varying distances within the cell. In the above example, the code symbol of length sixteen is repeated 256 times, resulting in a 4096-chip symbol that can be readily resolved even with significant variations in receipt delay.

Additionally, as described above relative to the example of FIG. 7, the preamble coding according to the preferred embodiment of the invention is especially efficient in its decoding. Referring to FIG. 7, each of the despreaders 102 can operate in parallel with one another, such that the entire despreading process 90 (FIG. 6) can be done at once. It has also been calculated that the expected computational complexity for the preamble coding of the preferred embodiment of the invention is less than that for conventional Gold coding. As a result, the benefits of the present invention in providing excellent resolution of preambles over wide distance variations and for rapidly moving transmitters are obtained at no computational cost, and indeed some improvement in the computational complexity.

As noted above, the present invention may be implemented in a variety of architectures and arrangements. In addition, it is contemplated that the coding and decoding described above may be implemented in combination with conventional approaches, including the conventional long coherent code, and segmented code, described above. In such combinations, it is further contemplated that a base station may receive and decode preambles according to the present invention and also according to these conventional techniques, in which case the base station may use the approach providing the highest correlation power.

In this regard, referring now to FIG. 8, the construction of chip-rate demodulate and despread function 48' according to a second preferred embodiment of the present invention will now be described in detail. This second preferred embodiment of the invention corresponds to a segmented non-coherent decoding of the incoming preamble; in this particular example, four segments are each sixty-four symbols long, with each symbol being a Walsh Hadamard code of length sixteen. Of course, other segment lengths may alternatively be used in combination with different code lengths, as desired. For the example of a 4096-chip long code and length sixteen Walsh Hadamard codes, alternative segment lengths and numbers may include eight segments of thirty-two symbols each, and two segments of 128 symbols each.

Figure 8:
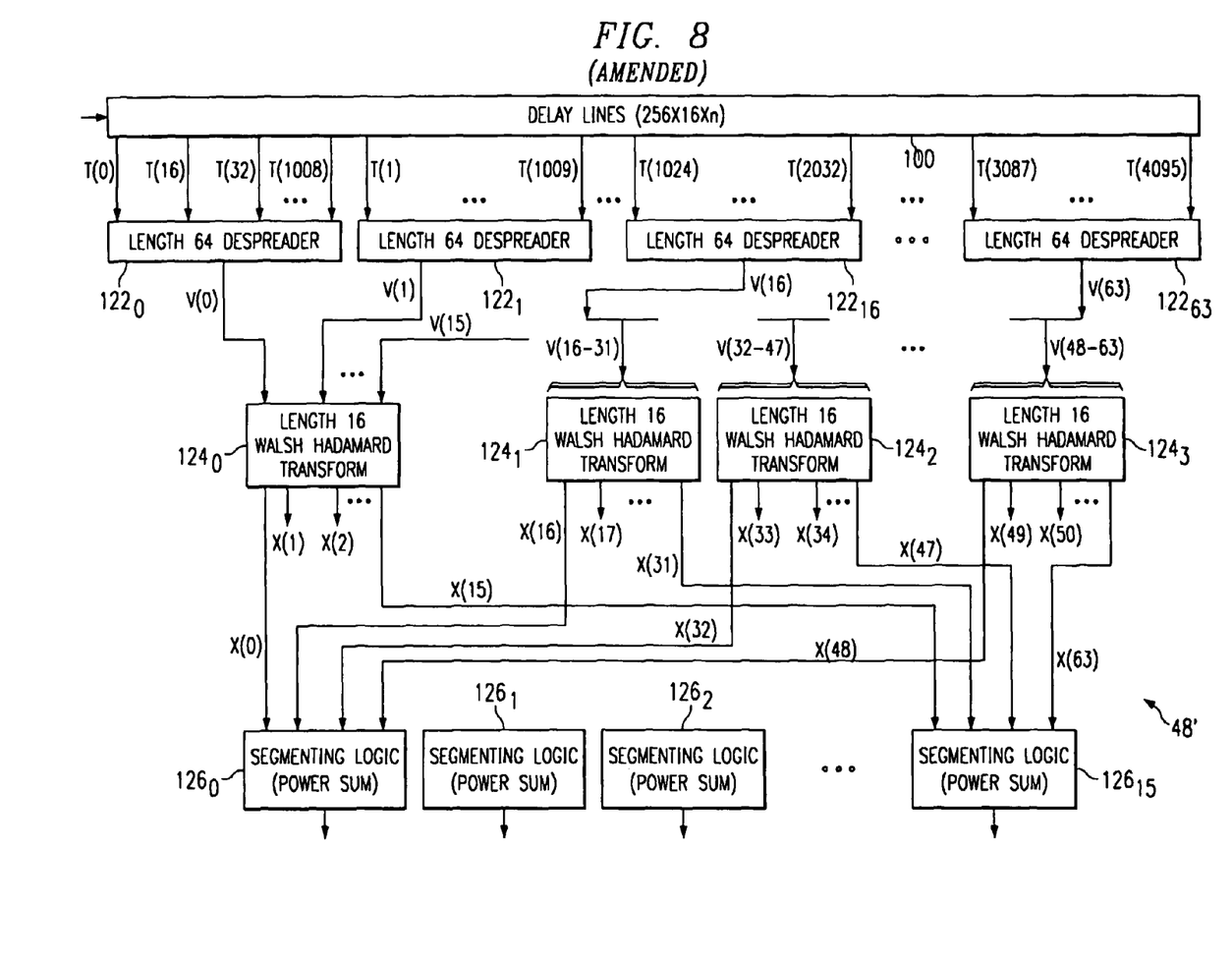
FIG. 8 is an electrical diagram, in block form, of chip-rate demodulation and despreading circuitry in a base station, according to a second preferred embodiment of the invention.

As shown in FIG. 8, the input data stream is again received by delay lines 100, as in the example of FIG. 7. As before, delay lines 100 include 256 delay lines $100_0$ through $100_{255}$, each having 16 times n delay stages D therein, where n is the oversampling factor. Delay lines 100 are tapped along their length as before, to provide 4096 outputs T(0) through T(4093) in this example. These outputs T are applied in an interleaved fashion to depsreaders $122_0$ through $122_{63}$, each of which are of length 64 in this embodiment of the invention.

According to this second preferred embodiment of the invention, the code symbols are considered in segments of sixty-four symbols each, rather than coherently over the entire 4096-chip long code length. As such, despreaders 122 receive inputs from only a subset of delay lines 100. For example, first despreader $122_0$ receives the first tap (i.e., prior to the first delay stage D) from each of the first sixty-four delay lines $100_0$ through $100_{63}$; according to the nomenclature of FIG. 8, these inputs are inputs T(0), T(16), T(32), . . . , up to T(1008). The next despreader $122_1$ receives the second tap from each of the first sixty-four delay lines $100_0$ through $100_{63}$, namely inputs T(1), T(17), and so on up to T(1009). In this manner, despreaders $122_0$ through $122_{15}$ receive each of the taps from the first sixty-four delay lines 100, namely the first 1024 taps on lines T(0) through T(1023). These first sixteen despreaders thus despread the interleaved chip samples of the first sixty-four repetitions of the length sixteen Walsh Hadamard code symbol, and thus despread the symbols of the first of four segments, according to this embodiment of the invention.

The next segment of sixty-four repetitions begins with despreader $122_{16}$, which receives the first taps from each of the next group of delay lines 100 (i.e., delay lines $100_{64}$ through $100_{127}$; these first taps are presented on lines T(1024) through T(2032). The remaining despreaders $122_{16}$ through $122_{63}$ are thus arranged in three more segments, similarly as for the first segment of despreaders $122_0$ through $122_{15}$, each despreader having a length of sixty-four. To the extent that a segmented cell-specific code was applied in transmission, to segments of sixty-four symbols, the four sets of despreaders 122 applied to these symbols divide out the cell-specific code from their inputs. According to the nomenclature of FIG. 8, the output of despreader $122_0$ is presented on line V(0), the output of despreader $122_1$ is presented on line V(1), and so on, with the output of the last despreader $122_{63}$ presented on line V(63).

According to this example, the sixty-four outputs V(0) through V(63) from despreaders 122 are then applied, in groups of sixteen to represent a length sixteen Walsh Hadamard code symbol, to one of four Walsh Hadamard transform and code correlation functions $124_0$ through $124_3$. Specifically, first Walsh Hadamard transform and code correlation function $124_0$ receives outputs V(0) through V(15), second Walsh Hadamard transform and code correlation function $124_1$ receives outputs V(16) through V(31), Walsh Hadamard transform and code correlation function $124_2$ receives outputs V(32) through V(47), and Walsh Hadamard transform and code correlation function $124_3$ receives outputs V(48) through V(63). As described above relative to FIG. 7, Walsh Hadamard transform and code correlation functions 124 transform the incoming symbol and compare the transformed symbol against the sixteen possible length sixteen Walsh Hadamard code values; each function 124 then generates sixteen outputs X, each indicative of the degree to which the incoming symbol matches the code value corresponding to the output.

According to this second preferred embodiment of the invention, outputs X from Walsh Hadamard transform and code correlation functions 124 are applied to segmenting logic functions $126_0$ through $126_{15}$, to determine the correspondence to the respective symbol values. Segmenting logic functions 126 number sixteen in this embodiment, because the number of possible Walsh Hadamard code values for a code of sixteen length is sixteen. In this regard, segmenting logic function $126_0$ corresponds to Walsh Hadamard code value ho indicated above in the table, and in general segmenting logic function $126_m$ corresponds to Walsh Hadamard code value $h_m$. As shown in FIG. 8, segmenting logic function $126_0$ receives output X(0) from Walsh Hadamard transform and code correlation function $124_0$, output X(1) from Walsh Hadamard transform and code correlation function $124_1$, output X(2) from Walsh Hadamard transform and code correlation function $124_2$, and output X(3) from Walsh Hadamard transform and code correlation function $124_3$. Each of these outputs X(0) through X(3) provide an indication of the degree to which the symbol applied to the corresponding Walsh Hadamard transform and code correlation function 124 matches Walsh Hadamard code symbol value $h_0$. Similarly, the other fifteen segmenting logic functions $126_1$ through $126_{15}$ receive their corresponding inputs from each of the Walsh Hadamard transform and code correlation functions 124, for their corresponding symbol.

According to this second preferred embodiment of the invention, segmenting logic functions 126 each perform a power summation of the amplitude of their input signals. Specifically, for the example of segmenting logic function $126_0$, the power summation corresponds to:

$$|X(0)|^2 + |X(16)|^2 + |X(32)|^2 + |X(48)|^2$$

The summation presented by segmenting logic functions 126, for each of their corresponding Walsh Hadamard code symbols h, provide a good indication of which symbol was transmitted by wireless unit UE as its preamble. The segmented nature of the decoding, according to this embodiment of the invention, provides additional immunity to Doppler shift effects, as the duration over which coherency is required is limited to sixty-four symbols, while each of the segments contributes to the code resolution operation.

Figure 9:
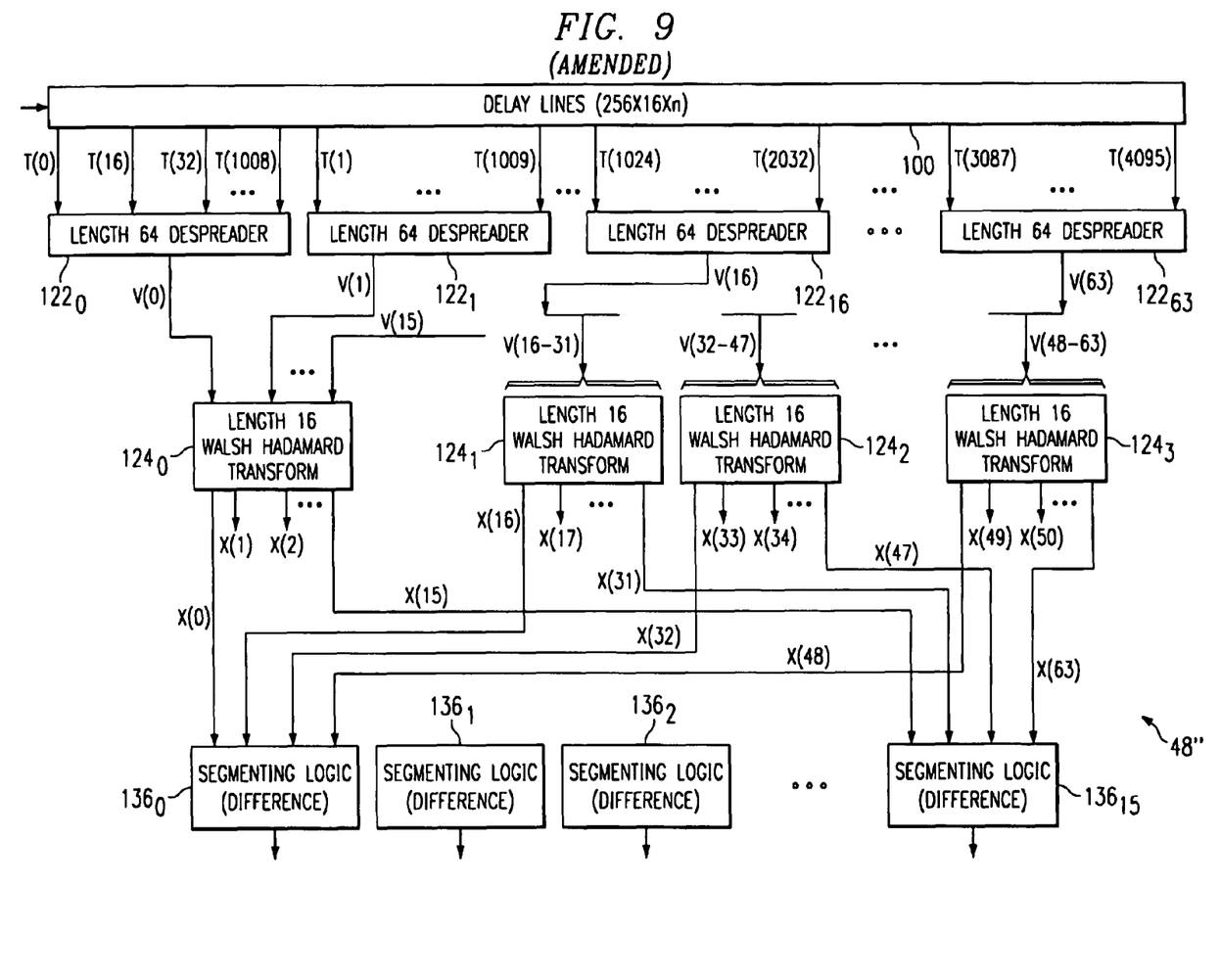
FIG. 9 is an electrical diagram, in block form, of chip-rate demodulation and despreading circuitry in a base station, according to a third preferred embodiment of the invention.

Referring now to FIG. 9, the construction of chip-rate demodulation and despreading function 48" according to a third preferred embodiment of the invention will now be described. Common elements in function 48" as in function 48' of FIG. 8 are referred to in connection with the same reference numeral, and as such no additional description will be provided for these elements.

According to this third preferred embodiment of the invention, however, segmenting logic functions 136 detect differentially encoded code symbols, also arranged into segments of sixty-four symbols in this example. In this embodiment of the invention, the preamble corresponds to a sequence of differences that are maximized for the symbol from segment to segment.

The signal paths in chip-rate demodulation and despreading function 48" shown in FIG. 9 are identical to those in FIG. 8 for function 48', in this example. This similarity includes segmenting logic function $136_0$ receiving output X(0) from Walsh Hadamard transform and code correlation function $124_0$, output X(1) from Walsh Hadamard transform and code correlation function $124_1$, output X(2) from Walsh Hadamard transform and code correlation function $124_2$, and output X(3) from Walsh Hadamard transform and code correlation function $124_3$. Similarly, the other fifteen segmenting logic functions $136_1$ through $136_{15}$ receive their corresponding inputs from each of the Walsh Hadamard transform and code correlation functions 124, for their corresponding symbol.

The function performed by segmenting logic function $136_0$, in deriving a difference value according to this preferred embodiment of the invention, corresponds to:

$$|X(1)X(0)^* + X(2)X(1)^* + X(3)X(2)^*|$$

where the * indicates complex conjugate. The same difference operation is performed by each of the other segmenting logic functions $136_1$ through $136_{15}$ upon their respective inputs. In this manner, the one of segmenting logic functions 136 generating the highest amplitude output based on its difference function will indicate the preamble value transmitted, as differentially encoded.

It is contemplated that these, and other coding and decoding alternative embodiments, may be used in connection with the present invention, while still attaining the benefits of efficient computation and realization, with good performance over varying transmission distances and mobile unit velocities.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A communication circuit, comprising:
   a first circuit coupled to receive a first plurality of repetitions of a first code having a length, the first code selected from a plurality of orthogonal codes; and
   a multiplier circuit coupled to receive the first plurality of repetitions of a first code and a second code having the length, the multiplier circuit producing a product of the first plurality of repetitions of a first code and the second code.

2. A communication circuit as in claim 1, comprising a modulator circuit coupled to receive the product, the modulator circuit producing a modulated product.

3. A communication circuit as in claim 1, wherein the modulated product comprises an in-phase component and a quadrature component.

4. A communication circuit as in claim 1, wherein the first plurality is 4 and the length is 64.

5. A communication circuit as in claim 1, wherein the first code is a Walsh Hadamard code.

6. A communication circuit as in claim 1, wherein the first code corresponds to a user in a wireless cell.

7. A communication circuit as in claim 1, wherein the second code is a scrambling code.

8. A communication circuit as in claim 1, wherein the second code corresponds to a base station in a wireless cell.

9. A method of communicating with a remote device, comprising the steps of:
   selecting a first code from a plurality of orthogonal codes;
   repeating the first code a plurality of times to produce a sequence having a length;
   combining the sequence with a second code having the length; and
   transmitting the sequence to the remote device.

10. A method as in claim 9, comprising the step of modulating the product.

11. A method as in claim 10, wherein the step of modulating comprises modulating an in-phase component and a quadrature component.

12. A method as in claim 9, wherein the plurality is 4 and the length is 64.

13. A method as in claim 9, wherein the first code is a Walsh Hadamard code.

14. A method as in claim 9, wherein the first code corresponds to a user in a wireless cell.

15. A method as in claim 9, wherein the second code is a scrambling code.

16. A method as in claim 9, wherein the second code corresponds to a base station in a wireless cell.

17. A method of operating a wireless communications unit to request a connection with a remote device, comprising the steps of:
   receiving a signal indicating at least one time slot within which a preamble may be transmitted by the wireless communications unit;
   selecting one of a plurality of orthogonal codes for the preamble;
   generating a spread code using the selected orthogonal code repeated a selected number of repetitions;
   multiplying the spread code by a scrambling code associated with the remote device, wherein the spread code has a length equal to a length of the scrambling code; and
   transmitting, to the remote device, a preamble signal corresponding to the multiplied spread code.

18. The method of claim 17, wherein the set of orthogonal codes consists of a set of Walsh Hadamard codes having a length of sixteen, wherein the generating step repeats a symbol of the Walsh Hadamard code 256 times, and wherein the length of the scrambling code is 4096 chips.

19. The method of claim 17, wherein the set of orthogonal codes consists of a set of Walsh Hadamard codes having a length of sixteen, wherein the generating step repeats a symbol of the Walsh Hadamard code 240 times, and wherein the length of the scrambling code is 3840 chips.

20. The method of claim 17, wherein the plurality of orthogonal codes corresponds to a set of Walsh Hadamard codes.

21. The method of claim 17, wherein the selecting step comprises executing a pseudo-random selection algorithm.

22. The method of claim 17, wherein the receiving step receives a signal indicating a plurality of time slots within which the preamble may be transmitted by the wireless communications unit; and further comprising: selecting one of the plurality of time slots for transmission of the preamble.

* * * * *